United States Patent
Sato et al.

(10) Patent No.: US 8,939,134 B2
(45) Date of Patent: Jan. 27, 2015

(54) APPARATUS FOR CONTROLLING INTERNAL COMBUSTION ENGINE

(75) Inventors: Kenji Sato, Shizuoka-Ken (JP); Teruaki Watanabe, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 373 days.

(21) Appl. No.: 13/401,129

(22) Filed: Feb. 21, 2012

(65) Prior Publication Data

US 2012/0215426 A1  Aug. 23, 2012

(30) Foreign Application Priority Data

Feb. 22, 2011  (JP) ................. 2011-035429

(51) Int. Cl.
  *F02D 41/22*  (2006.01)
  *B60K 6/46*  (2007.10)
  *B60W 10/06*  (2006.01)
  (Continued)

(52) U.S. Cl.
  CPC ............ *B60K 6/46* (2013.01); *B60W 10/06* (2013.01); *B60W 10/08* (2013.01); *F02D 41/042* (2013.01); *F02D 41/1494* (2013.01); *B60W 2510/0619* (2013.01); *B60Y 2300/474* (2013.01); *F02D 41/1454* (2013.01); *F02D 2200/021* (2013.01); *F02D 2200/0414* (2013.01); *F02N 11/0814* (2013.01); *Y02T 10/6286* (2013.01); *Y02T 10/6217* (2013.01)
  USPC ............ 123/697; 123/690; 701/107; 701/112

(58) Field of Classification Search
  CPC .......................... F02D 41/1494; F02D 41/042
  USPC .......... 123/672, 676, 697, 690; 701/107, 108, 701/109, 112, 113
  See application file for complete search history.

(56) References Cited

U.S. PATENT DOCUMENTS

| 4,753,204 A | 6/1988 | Kojima et al. |
| 4,915,082 A * | 4/1990 | Uchinami et al. ............ 123/697 |

(Continued)

FOREIGN PATENT DOCUMENTS

| CN | 101446242 A | 6/2009 |
| DE | 102004052772 A1 | 5/2006 |
| JP | 62020145 | 1/1987 |
| JP | S6220145 U | 2/1987 |
| JP | S6388243 A | 4/1988 |

(Continued)

OTHER PUBLICATIONS

Chinese Office Action for Application No. 201210042562.3 dated Apr. 3, 2014.

(Continued)

*Primary Examiner* — Hai Huynh
(74) *Attorney, Agent, or Firm* — Lerner, David, Littenberg, Krumholz & Mentlik, LLP (57) ABSTRACT

An apparatus for controlling an internal combustion engine executes air-fuel ratio feedback control based on a detection result of an exhaust gas sensor and when the engine is shut down, stops energization of a heater of the exhaust gas sensor at a predetermined timing after shutdown of the engine, heater control of the exhaust gas sensor is executed, which is suitable for a case in which shutdown time of the engine is set long, and thus the exhaust gas sensor is protected from thermal shock. The control apparatus sets timing for stopping energization of a heater of an exhaust gas sensor after shutdown of the engine, to a point in time when a predetermined time set based on outside air temperature has elapsed, or a point in time when cooling water temperature of the engine has dropped to a predetermined temperature.

2 Claims, 4 Drawing Sheets

(51) Int. Cl.
*B60W 10/08* (2006.01)
*F02D 41/04* (2006.01)
*F02D 41/14* (2006.01)
*F02N 11/08* (2006.01)

(56) References Cited

U.S. PATENT DOCUMENTS

| | | | |
|---|---|---|---|
| 7,591,259 B2 * | 9/2009 | Aoki | 123/697 |
| 7,654,077 B2 * | 2/2010 | Zillmer et al. | 60/277 |
| 7,820,949 B2 * | 10/2010 | Sasaki et al. | 219/497 |
| 2005/0205550 A1 | 9/2005 | Saito et al. | |
| 2008/0209886 A1 | 9/2008 | Zillmer et al. | |
| 2009/0143960 A1 | 6/2009 | Matsumoto | |

FOREIGN PATENT DOCUMENTS

| | | |
|---|---|---|
| JP | 05133262 | 5/1993 |
| JP | 06017707 | 1/1994 |
| JP | 09-088688 A | 3/1997 |
| JP | 2010-209799 A | 9/2010 |

OTHER PUBLICATIONS

German Office Action for Application No. 10 2012 101 190.7 dated Jun. 3, 2014.
Japanese Office Action for Application No. 2011-035429 dated Mar. 17, 2014.
Redundanz (Technik), Established on Dec. 10, 2010, 10:41 a.m., Wikipedia [online].

* cited by examiner

APPARATUS FOR CONTROLLING INTERNAL COMBUSTION ENGINE

BACKGROUND OF THE INVENTION

1. Field of the Invention

The present invention relates to an apparatus for controlling an internal combustion engine, and more specifically, relates to a control apparatus for controlling a heater of an exhaust gas sensor of an internal combustion engine mounted in a vehicle. Moreover, the control apparatus according to an embodiment of the present invention is favorably used in the case of a mode in which changeover between an operating state and a shutdown state of the internal combustion engine is performed repeatedly during driving of the vehicle, and the shutdown state of the internal combustion engine continues for a relatively long time.

2. Description of Related Art

Recently, in order to enhance fuel efficiency in vehicles, a hybrid vehicle has been proposed as an electric vehicle and has been put into practical use.

The hybrid vehicles may be classified into a series hybrid vehicle in which electric energy is generated by driving a generator by an internal combustion engine and a motor drives the vehicle by the electric energy, and a parallel hybrid vehicle in which an internal combustion engine and a motor drive the vehicle.

In the series hybrid vehicle, a power generating part using the internal combustion engine and a driving part using the motor can operate substantially separately. Therefore, the changeover between the operating state and the shutdown state of the internal combustion engine can be set freely. That is to say, the series hybrid vehicle can be set to any of: a mode in which the internal combustion engine is operated at all times, and a mode in which the internal combustion engine is intermittently driven (a mode in which changeover between the operating state and the shutdown state of the internal combustion engine is repeatedly performed).

In the case in which the vehicle is set to the mode in which the internal combustion engine is intermittently driven, the internal combustion engine is used as a range extender (RE) that extends a cruising range of the vehicle, and changeover is made between hybrid driving and EV driving (the internal combustion engine is shut down and driving by the motor is performed only by a battery), that is, the operating state and the shutdown state of the internal combustion engine is changed over, regardless of a driving state and a stopped state of the vehicle. Consequently, the time for shutting down the internal combustion engine temporarily may be longer (about several minutes) as compared to a so-called idling stopped vehicle.

Moreover, in the idling stopped vehicle, generally, in order to purify the exhaust gas at the time of restart of the internal combustion engine, a heater attached to the exhaust gas sensor is energized to activate the exhaust gas sensor during shutdown of the internal combustion engine.

In the exhaust gas sensor having the heater attached thereto, generally, after startup of the internal combustion engine, energization of the heater is performed after the exhaust gas temperature increases and it is determined that no condensed water is generated in the exhaust pipe, and there is no possibility of damage, such as cracking.

However, as in the range extender (RE) among the series hybrid vehicles, if temporary shutdown of the internal combustion engine (idling stop) continues for a long time after the internal combustion engine is activated and the exhaust gas temperature increases once, the temperature of the exhaust pipe decreases to generate condensed water. Then at the time of restart of the internal combustion engine, the condensed water splashes onto the exhaust gas sensor, and at that time, if energization of the heater is being performed, the probability of occurrence of cracking increases.

Moreover, in the series hybrid vehicle, when driving is performed while the internal combustion engine is shut down, the temperature of the exhaust pipe decreases due to the influence of the outside air temperature, the traveling wind, or heat dissipation, and there is a high probability of cracking of the exhaust gas sensor caused by water splashing.

An activation control apparatus of an air-fuel ratio sensor according to Japanese Laid-open Patent Application Publication No. H09-088688 considers that activation of the air-fuel ratio sensor is necessary at the time of shutdown of the engine due to engine automatic stop and start (eco-run), and energization control of a heater is implemented in order to hold the air-fuel ratio sensor in an activated state. That is to say, at the time of shutdown of the engine, a required time until the air-fuel ratio sensor becomes an inactivated state is estimated according to the temperature of engine cooling water, and when the required time has elapsed since shutdown of the engine, energization of the heater (duty control) is started. Moreover, energization of the heater is terminated at a point in time when a predetermined heater control termination time has elapsed since shutdown of the engine.

In a heater control apparatus of a sensor having a heater attached thereto according to Japanese Laid-open Patent Application Publication No. 2010-209799, in order to prevent cracking of the sensor caused by water splashing, energization of the heater is allowed when the exhaust gas temperature is equal to or higher than a first determination temperature, and also energization of the heater is allowed when the exhaust gas temperature is equal to or higher than a second determination temperature but is lower than the first determination temperature, and a degree of drying progress based on a history of exhaust gas temperature is equal to or higher than a predetermined determination value.

SUMMARY OF THE INVENTION

However, in Japanese Laid-open Patent Application Publication No. H09-088688, only one timing for finally turning off energization of the heater of the exhaust gas sensor (heater control termination time since shutdown of the engine) is set, and an environment such as with a long temporary shutdown time during which moisture in the exhaust gas condenses is not taken into consideration. Therefore, cracking of the sensor caused by water splashing may not be prevented. Moreover, because short temporary shutdown time is the main aim, only the off time in the duty control when the exhaust gas sensor is maintained in the activated state is long corresponding to cooling water temperature. Consequently, although a time set corresponding to the cooling water temperature is used, it is the time only for maintaining the activated state. Therefore it does not have a relationship to technical problems depending on the environment such as with a long temporary shutdown time during which moisture in the exhaust gas condenses.

Furthermore, the disclosure of Japanese Laid-open Patent Application Publication No. 2010-209799 is for speeding up the timing for turning on energization of the heater of the exhaust gas sensor, and hence, although a degree of dryness relating to moisture is taken into consideration, a technique for determining when to turn off energization during long temporary shutdown time is not disclosed.

Incidentally, it is difficult to ascertain beforehand, startup timing of the internal combustion engine, that is, changeover timing from the shutdown state to the operating state, while ensuring enough time allowance at all times. This is difficult similarly under a condition of a human-induced operation (for example, step-on operation of an accelerator pedal or releasing operation of brake pedal) or under a condition of determination of a state of charge (SOC) value (%), which is information of a state of charge of a traction battery or information of a remaining battery level. In the case in which determination of the SOC value of the traction battery is made the condition, it has been difficult for a control unit of the internal combustion engine (engine controller: ECM) that performs only basic combustion control, to independently perform determination of the SOC value of the traction battery.

It is therefore an object of an aspect of the present invention to provide an apparatus for controlling an internal combustion engine that executes heater control of an exhaust gas sensor, which is suitable for a case in which shutdown time of an internal combustion engine in which changeover between an operating state and a shutdown state is repeatedly performed, is set long, thereby protecting the exhaust gas sensor from thermal shock.

An aspect of the present invention provides an apparatus for controlling an internal combustion engine that includes: an exhaust gas sensor that detects a specific component in the exhaust gas of the internal combustion engine; a heater that is attached to the exhaust gas sensor and that can promptly activate the exhaust gas sensor and maintain the exhaust gas sensor in an activated state; and a control device that executes air-fuel ratio feedback control based on a detection result of the exhaust gas sensor in the activated state, and in a case in which the internal combustion engine is shut down, stops energization of the heater at a predetermined timing after shutdown of the internal combustion engine.

The control device sets the timing for stopping energization of the heater after shutdown of the internal combustion engine, to a point in time when a predetermined time set based on outside air temperature has elapsed or a point in time when cooling water temperature of the internal combustion engine has dropped to a predetermined temperature.

The apparatus for controlling an internal combustion engine according to an aspect of the present invention can execute heater control of the exhaust gas sensor, which is suitable for a case in which shutdown time of an internal combustion engine in which changeover between the operating state and the shutdown state is repeatedly performed is set long, and can thus protect the exhaust gas sensor from thermal shock.

Other objects and features of an aspect of the present invention will be understood from the following description with reference to the accompanying drawings.

DETAILED DESCRIPTION OF THE PREFERRED EMBODIMENTS

An object of an embodiment of the present invention is to execute heater control of an exhaust gas sensor suitable for when shutdown time of an internal combustion engine in which changeover between an operating state and a shutdown state is repeatedly performed, is set long, and protect the exhaust gas sensor from thermal shock. The object is achieved by setting timing for turning off heater energization after shutdown of the internal combustion engine, based on a point in time when a predetermined time set based on outside air temperature has elapsed and a point in time when cooling water temperature of the internal combustion engine has dropped to a predetermined temperature, and by turning off heater energization by a first control unit based on a determination performed by a second control unit.

Hereunder an embodiment of the present invention will be explained in detail based on the drawings.

Figure 1:
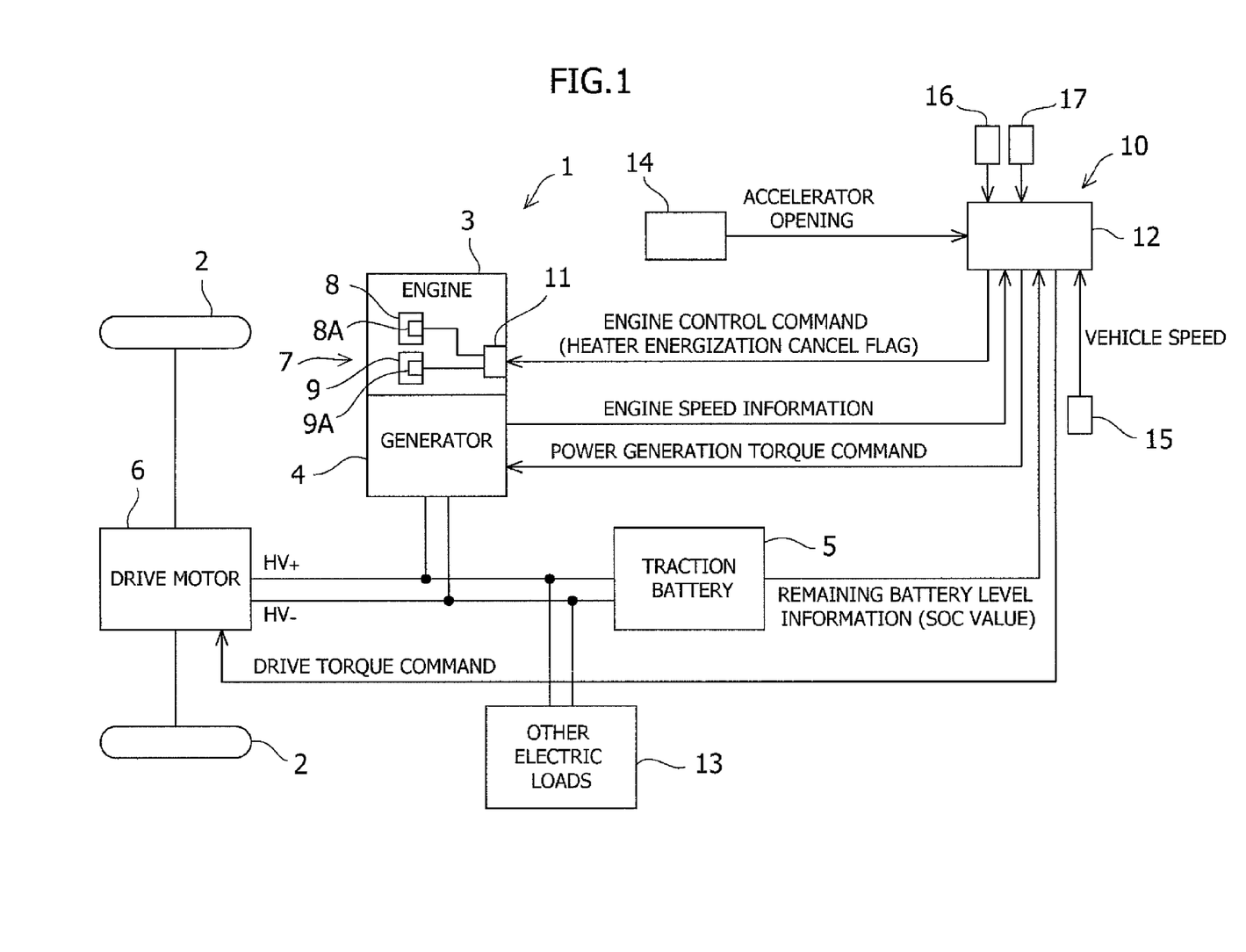
FIG. 1 is a system block diagram of an apparatus for controlling an internal combustion engine illustrating one embodiment of the present invention.

FIG. 1 is a system block diagram of an apparatus for controlling an internal combustion engine illustrating one embodiment of the present invention.

In FIG. 1, reference sign 1 denotes a series hybrid vehicle (hereinafter, simply referred to as a "hybrid vehicle") serving as an electric vehicle, and 2 denotes drive wheels.

The hybrid vehicle 1 is equipped with; an internal combustion engine 3, a generator 4 driven by the internal combustion engine 3, a traction battery 5 that can store power generated by the generator 4 and can detect an SOC value which indicates a power storage state, and a drive motor 6 that can drive the vehicle 1 by using power generated by the generator 4 or power stored in the traction battery 5.

The internal combustion engine 3 is provided with an exhaust gas sensor 7 that can detect a concentration of a specific component, particularly oxygen concentration in the exhaust gas of the internal combustion engine 3 to thereby detect an air-fuel ratio of the air-fuel mixture to be supplied to the internal combustion engine 3.

The exhaust gas sensor 7 includes an air-fuel ratio sensor (front $O_2$ sensor) 8 arranged for example in the center of a merging portion of an exhaust manifold, which is on an upstream side of an exhaust emission catalyst, and a rear $O_2$ sensor 9 arranged in an exhaust pipe on a downstream side of the catalyst.

The air-fuel ratio sensor 8 is for detecting oxygen concentration in the exhaust gas, thereby detecting an air-fuel ratio of an air-fuel mixture supplied to the internal combustion engine 3. Particularly, an output voltage thereof proportionally changes according to oxygen concentration, and hence, the air-fuel ratio sensor 8 can linearly detect the air-fuel ratio over a wide range from lean to rich concentration. Moreover the air-fuel ratio sensor 8 includes a heater 8A that can promptly activate the air-fuel ratio sensor 8 and maintain the air-fuel ratio sensor 8 in an activated state, attached thereto, that is, built therein.

The rear $O_2$ sensor 9 can detect a change in oxygen concentration in the exhaust gas, because an output voltage thereof largely changes on a lean side and a rich side according to the oxygen concentration in the exhaust gas. Moreover the rear $O_2$ sensor 9 also includes a heater 9A that can promptly activate the rear $O_2$ sensor 9 or maintain the rear $O_2$ sensor 9 in an activated state, attached thereto, that is, built therein.

The internal combustion engine 3 is controlled by a control apparatus 10.

The control apparatus 10 includes: a first control unit (engine controller (ECM)) 11 serving as a control device that controls a fuel injection amount, an ignition timing, and the like to control a combustion state for a stoichiometric operation or an enrich operation, and a second control unit (hybrid controller (HCU)) 12 serving as another control device that outputs an internal combustion engine control command (including a signal of a heater energization cancel flag) (PWR 3) to the first control unit 11. Specifically, the control apparatus 10 is suitable for a vehicle that uses the internal combustion engine 3 as a range extender (RE) that extends a cruising range of the vehicle.

The first control unit 11 executes air-fuel ratio feedback control based on detection results of the air-fuel ratio sensor 8 and the rear $O_2$ sensor 9 in the activated state, and controls the heaters 8A and 9A of the air-fuel ratio sensor 8 and the rear $O_2$ sensor 9.

The first control unit 11 performs the air-fuel ratio feedback control by using information of the air-fuel ratio sensor 8 on the upstream side of the catalyst as well as information of the rear $O_2$ sensor 9 as determination elements, thereby enabling to maintain high catalytic conversion efficiency at all times and stabilize the exhaust gas.

In the heater control for the air-fuel ratio sensor 8 by the first control unit 11, energization of the heater 8A of the air-fuel ratio sensor 8 is duty-controlled in order to accelerate activation of the air-fuel ratio sensor 8 or maintain the activated state thereof.

In the heater control for the rear $O_2$ sensor 9 by the first control unit 11, energization of the heater 9A of the rear $O_2$ sensor 9 is duty-controlled in order to accelerate activation of the rear $O_2$ sensor 9 or maintain the activated state thereof.

When the internal combustion engine 3 is shut down, energization of the heaters 8A and 9A is stopped at a predetermined timing after shutdown of the internal combustion engine 3. However, suspension of energization of the heaters 8A and 9A by the first control unit 11 is performed according to a command from the second control unit 12. That is to say, upon reception of a signal of a heater energization cancel flag from the second control unit 12, the first control unit 11 stops energization (duty control signal) of the heater 8A of the air-fuel ratio sensor 8 and the heater 9A of the rear $O_2$ sensor 9, thereby cancelling energization.

The generator 4, the drive motor 6, and the first control unit 11 communicate with the second control unit 12. Moreover other electric loads 13 are connected to between the generator 4 and the traction battery 5.

The second control unit 12 communicates with the traction battery 5 in order to input the SOC value, which is the information of the state of charge or the information of the remaining battery level, and also communicates with the generator 4 in order to input information of the engine speed. The second control unit 12 also communicates with an accelerator sensor 14 that detects an opening degree of an accelerator, a vehicle speed sensor 15 that detects a vehicle speed, an outside air temperature sensor 16 that detects an outside air temperature, and a water temperature sensor 17 that detects a cooling water (coolant) temperature of the internal combustion engine 3. The outside air temperature sensor 16 can be provided in an engine compartment for the system. However, a sensor provided for other systems such as an air-conditioning system can be used.

The second control unit 12 outputs an internal combustion engine control command (including the signal of the heater energization cancel flag) (PWR 3) to the first control unit 11 to control the drive of the internal combustion engine 3, and outputs a power generation torque command to control the drive of the generator 4. The second control unit 12 also outputs a drive torque command to control the drive of the drive motor 6.

Figure 2:
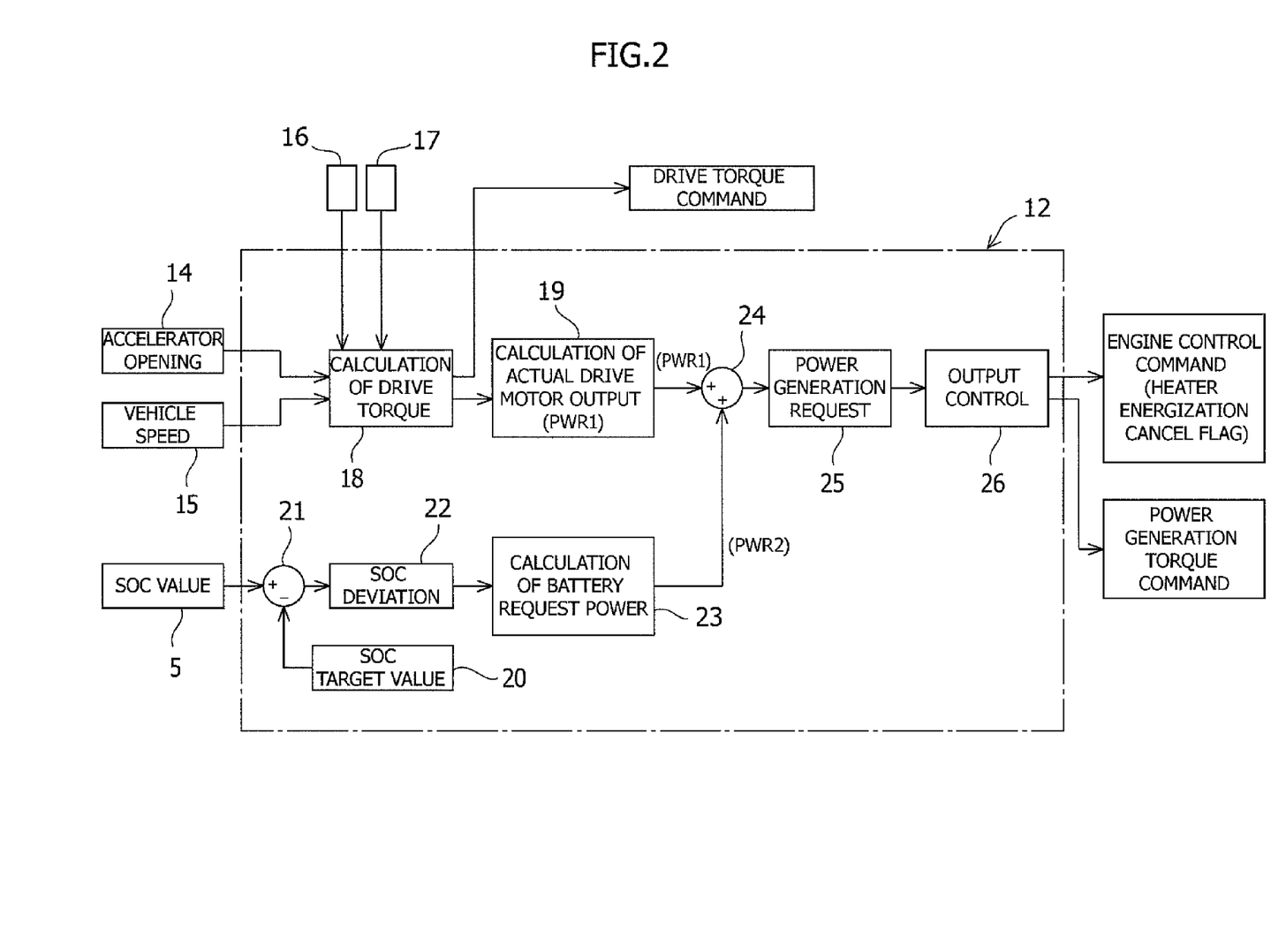
FIG. 2 is a block circuit diagram of a second control unit in the embodiment.

As shown in FIG. 2, the second control unit 12 controls an output of the internal combustion engine 3 at the time of power generation by the generator 4 so as to determine power energy. The second control unit 12 includes: a drive torque calculating section 18 that calculates a drive torque command by communicating with the accelerator sensor 14, the vehicle speed sensor 15, the outside air temperature sensor 16, and the water temperature sensor 17, and outputs the drive torque command to the drive motor 6; an actual drive-motor output calculating section 19 that communicates with the drive torque calculating section 18 and calculates an actual drive motor output (PWR 1); an SOC value comparing section 21 that communicates with the traction battery 5 and an SOC target-value setting section 20, and compares an SOC value (%) from the traction battery 5 with an SOC target value (%) from the SOC target-value setting section 20; an SOC deviation calculating section 22 that communicates with the SOC value comparing section 21 and calculates a deviation of the SOC value from the SOC target value; a battery request power calculating section 23 that communicates with the SOC deviation calculating section 22 and calculates a battery request power (PWR 2); an output comparing section 24 that communicates with the battery request power calculating section 23 and the actual drive-motor output calculating section 19, and compares a battery request power (PWR 2) with the actual drive motor output (PWR 1); a power generation request section 25 that communicates with the output comparing section 24; and an output control section 26 that communicates with the power generation request section 25 and outputs an internal combustion engine control command (including a signal of the heater energization cancel flag) (PWR 3) to the first control unit 11, and outputs a power generation torque command to the generator 4.

The second control unit 12 also has a control command function for instructing the first control unit 11.

The second control unit 12 has a control command function (internal combustion engine control command function) for instructing the first control unit 11 of the internal combustion engine 3 to change over between the operating state and the shutdown state of the internal combustion engine 3, or instructing the first control unit 11 on the degree of the operating state, based on a vehicle state such as the SOC value of the traction battery 5. The second control unit 12 performs determination in the flowchart shown in FIG. 3, and transmits a signal of the heater energization cancel flag to the first control unit 11 as one of the internal combustion engine control commands.

The second control unit 12 controls the drive motor 6 by transmitting a drive torque command thereto. The drive torque command to the drive motor 6 required for vehicle driving is calculated based on the accelerator opening (throttle opening) according to a human-induced operation of a driver, and the vehicle speed.

The second control unit 12 performs control by transmitting an internal combustion engine control command to the first control unit 11 of the internal combustion engine 3 and transmitting a power generation torque command to the generator 4, in order to generate power to be consumed by the drive motor 6 and other electric loads 13.

The second control unit 12 calculates a "driver-requested power generation amount", the "SOC value", and "requested power for achieving the SOC target value", and controls the output of the internal combustion engine 3.

The operating state and the shutdown state of the internal combustion engine 3 basically depend on the SOC value of the traction battery 5. When the SOC value decreases, the internal combustion engine 3 is started to enter the operating state, and when the SOC value increases, the internal combustion engine 3 is shut down.

When the internal combustion engine 3 is being operated, the generator 4 generates power, and at this time, the second control unit 12 performs control so that power consumed becomes equal to power generated. By using the traction battery 5 as a power buffer to charge and discharge a difference of power balance, there is no longer the need for the instantaneous values of the power consumed and the power generated to agree with each other.

The control apparatus 10 sets timing for stopping energization of the heaters 8A and 9A to a point in time when a predetermined time set based on the outside air temperature has elapsed or when the cooling water temperature of the internal combustion engine 3 has dropped to a predetermined temperature. In other words, energization of the heaters 8A and 9A is stopped at the earliest point in time.

Moreover, the second control unit 12 sets the predetermined time based on the outside air temperature, and measures the elapsed time since shutdown of the internal combustion engine 3, and performs a first determination of whether the measured elapsed time has reached the set predetermined time, and while the second control unit 12 performs a second determination of whether the cooling water temperature of the internal combustion engine 3 has reached a predetermined temperature for determination of a decrease in water temperature set beforehand. The second control unit 12 also transmits a signal for cancelling heater energization, to the first control unit 11 based on these two determinations. Then the first control unit 11 stops energization of the heaters 8A and 9A upon reception of the signal for cancelling the heater energization.

The second control unit 12 determines a drop of the cooling water temperature of the internal combustion engine 3 based on whether the cooling water temperature reaches the preset predetermined temperature or drops to a temperature lower than the predetermined temperature. However, an amount of temperature drop of cooling water can be set and compared with a difference in detection temperatures since shutdown of the internal combustion engine 3.

Operation (combustion) of the internal combustion engine 3 is performed as described below.

The second control unit 12 calculates the "driver-requested power generation amount" based on an accelerator operation (throttle operation), which is a human-induced operation by a driver. Moreover the second control unit 12 can calculate a "drive motor torque" based on the vehicle speed and the accelerator operation (throttle operation), which is a human-induced operation by the driver.

A set value $\alpha$ is set as a lower limit of a range allowable as a normal range of use of the traction battery 5, that is, as an allowable lower-limit value. If the SOC value at the present moment (at the time of calculation), is equal to or greater than the set value $\alpha$, it is determined that the SOC value has an allowance with respect to the allowable lower-limit value. The normal range of use of the traction battery 5 is set in a narrower range than a usable range of the traction battery 5, and thus, the allowable lower-limit value is a large value with a margin as compared to the lower-limit value in the usable range of the traction battery 5.

If the SOC value at the present moment is lower than the set value $\alpha$, it is determined that the SOC value cannot be decreased any more, and charge of the battery is required.

Moreover a value of the "driver-requested power generation amount" plus "requested power for achieving the SOC target value" is set as a "target output of the internal combustion engine" to improve the SOC value, while ensuring a drive output based on the human-induced operation. At this time, the operation (combustion) of the internal combustion engine 3 is in an enrich area.

In operation (combustion) of the internal combustion engine 3, a threshold $\beta$ corresponding to an engine output corresponding to a boundary between a stoichiometric area and the enrich area is set. When the SOC value at the present moment is equal to or greater than the set value $\alpha$, the value of the "driver-requested power generation amount" plus "requested power for achieving the SOC target value" is compared with the threshold $\beta$.

If the value of the "driver-requested power generation amount" plus "requested power for achieving the target SOC value" is lower than the threshold $\beta$, the value of the "driver-requested power generation amount" plus "requested power for achieving the target SOC value" is set as the "target output of the internal combustion engine" to improve the SOC value, while ensuring the drive output based on the human-induced operation. At this time, the operation (combustion) of the internal combustion engine 3 is in the stoichiometric area.

If the value of the "driver-requested power generation amount" plus "requested power for achieving the target SOC value" exceeds the threshold $\beta$, the value of the "driver-requested power generation amount" plus "requested power for achieving the target SOC value" is set to the same value as the threshold $\beta$ to improve the SOC value if it is allowable, while giving priority to and ensuring the drive output based on the human-induced operation as much as possible. At this time, power generation for a deviation of the SOC value is not charged as is, but is suppressed. If only a value of the "driver-requested power generation amount" is greater than the threshold $\beta$, the drive torque of the vehicle is limited, and improvement of the SOC value (charge to the traction battery 5) is not performed. Also at this time, the operation (combustion) of the internal combustion engine 3 is in the stoichiometric area.

Moreover a method for determining power generated by the internal combustion engine 3 is explained below.

A driver-requested power generation amount for supplying power required for vehicle driving is calculated based on the drive torque. The driver-requested power generation amount corresponds to the actual drive motor output (PWR 1). A calculation result of power generation amount by calculating the driver-requested power generation amount need not necessarily agree with the power consumed by the drive motor 6.

Because a power generation amount, having an influence on vehicle driving, closely relates to the operating state of the internal combustion engine 3, the driver-requested power generation amount is determined based on the operating state mainly depending on the accelerator opening (throttle opening) so that the power generation amount does not deviate from the operating state of the internal combustion engine 3 expected for the operation and a driver does not have a sense of incompatibility. The driver-requested power generation amount is set nonlinearly so that an increased gradient when the accelerator opening (throttle opening) is large becomes smaller than that of when the accelerator opening (throttle opening) is small.

An SOC deviation, which is a difference between the SOC value and the SOC target value, is obtained, and a power generation correction amount is calculated based on the SOC deviation. The power generation correction amount corresponds to the requested power (PWR 2) for achieving the SOC target value. Then, because the SOC value is controlled respectively to charged and discharged states based on the SOC deviation, the SOC value falls inside a range centered on the SOC target value.

The actual drive motor output (PWR 1), which is the driver-requested power generation amount, and the requested power (PWR 2) for achieving the SOC target value for calculation of the power generation correction amount are added, thereby obtaining a power generation request. Power generation control is performed according to this power generation request. Moreover in the combustion control of the internal combustion engine 3, a target output (PWR 3) of the internal combustion engine 3, which is a final internal combustion engine control command, is obtained based on this power generation request.

When the power generation control is executed according to only the driver-requested power generation amount, there may be a significant tendency of the traction battery 5 towards a current flowing-in state or to a current flowing-out state, thereby causing overcharge or overdischarge. However, these can be avoided by the control described above.

Figure 4:
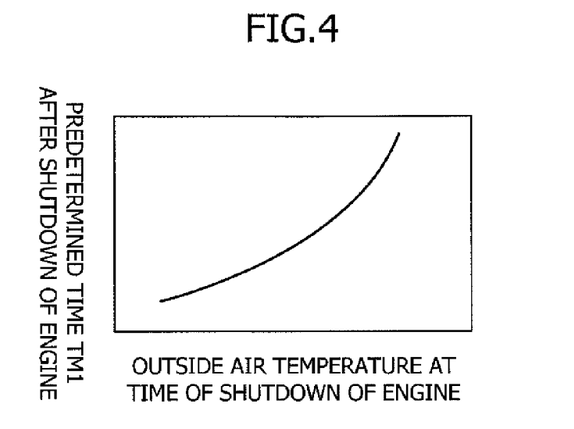
FIG. 4 is a diagram showing a table for setting predetermined time to be used in the flowchart in FIG. 3.

Predetermined time TM1 set based on the outside air temperature at the time of shutdown of the internal combustion engine 3 is stored by the second control unit 12 as the table shown in FIG. 4. The tendency thereof is nonlinear, as shown in FIG. 4, and as the outside air temperature becomes lower, the predetermined time TM1 becomes shorter, and as the outside air temperature becomes higher, the predetermined time TM1 becomes longer. Moreover, as the outside air temperature becomes higher than an intermediate temperature (a temperature around normal temperature), an increasing rate of the predetermined time TM1 becomes higher, and as the outside air temperature becomes lower than the intermediate temperature, a decreasing rate of the predetermined time TM1 becomes lower.

Figure 3:
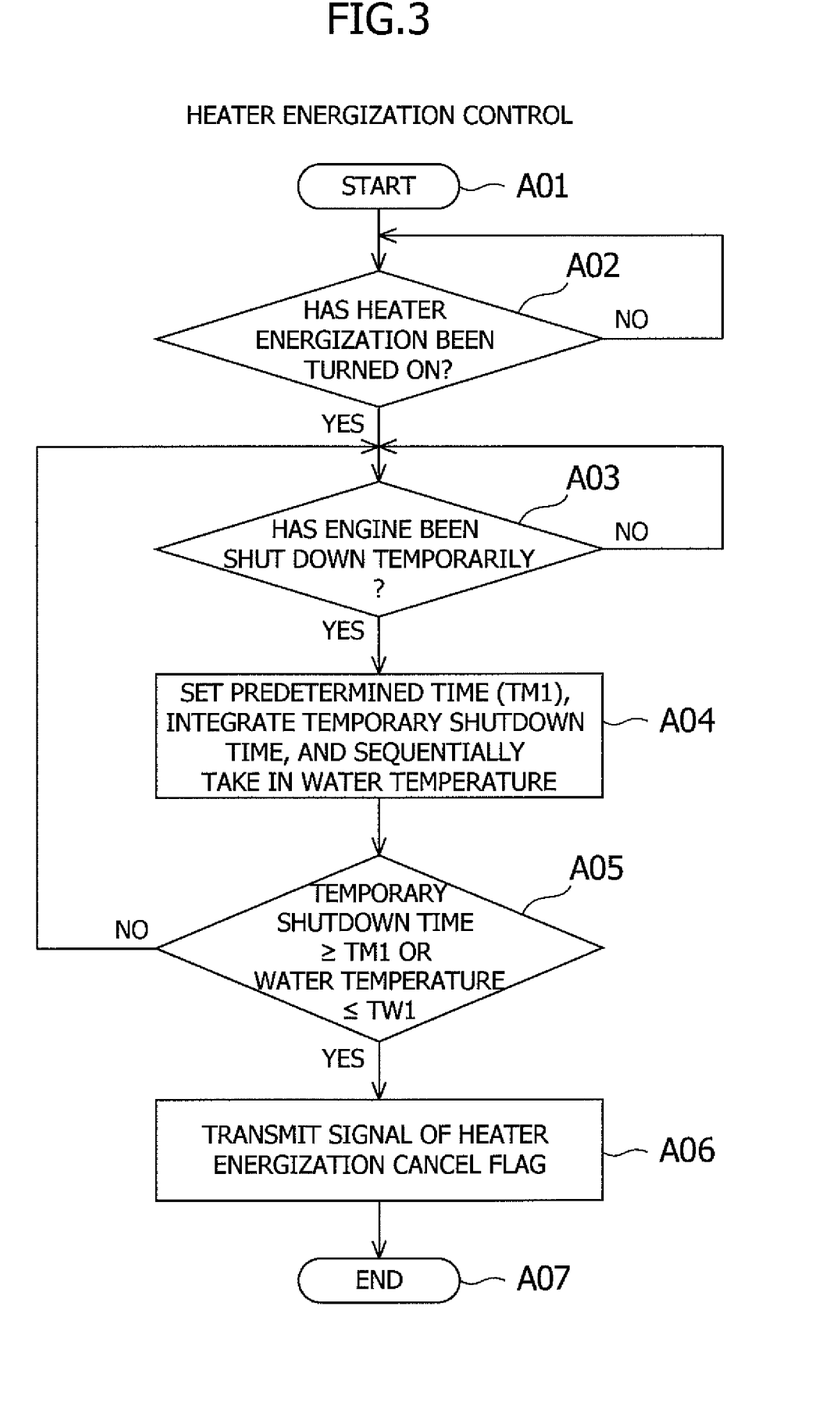
FIG. 3 is a flowchart of heater energization control performed by the second control unit in the embodiment.
Figure 5:
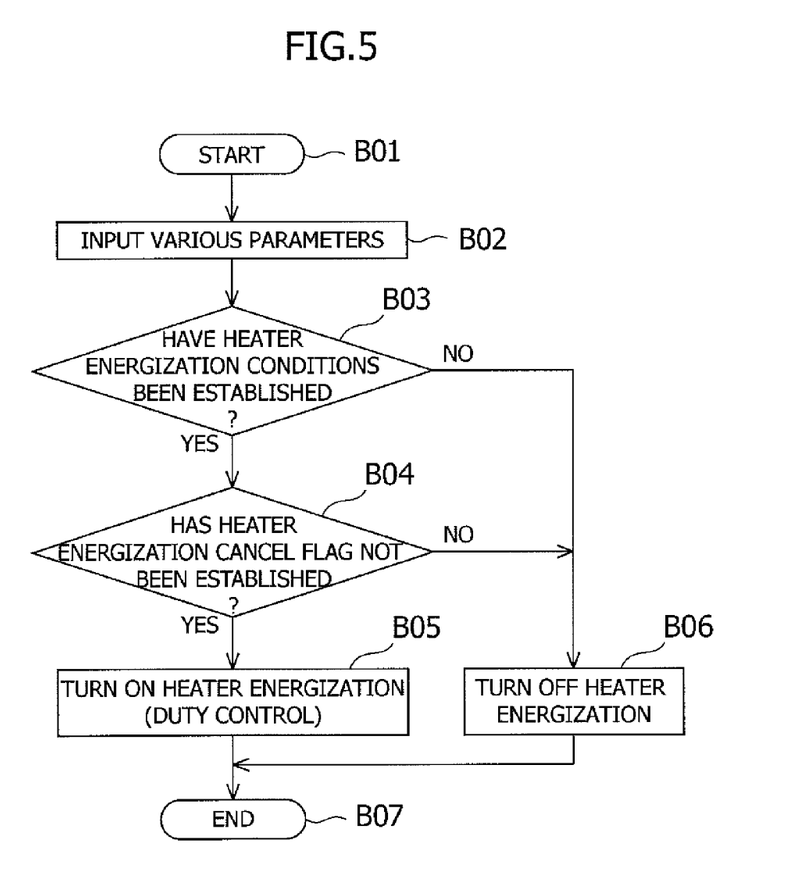
FIG. 5 is a flowchart of heater energization control performed by a first control unit in the embodiment.

Next the heater control of the exhaust gas sensor 7, according to the present embodiment will be explained based on the flowcharts in FIG. 3 and FIG. 5. FIG. 3 is a flowchart of the heater energization control performed by the second control unit 12, and FIG. 5 is a flowchart of the heater energization control performed by the first control unit 11.

The second control unit 12 performs the heater energization control as shown in FIG. 3.

When a program of the heater energization control in FIG. 3 is started (step A01), at first in step A02, the second control unit 12 determines whether heater energization has been turned on, and if NO, the determination is continued.

When the determination in step A02 is YES, control proceeds to step A03. In step A03, it is determined whether the internal combustion engine 3 has been temporarily shut down, and if NO, the determination is continued.

When the determination in step A03 is YES, control proceeds to step A04. In step A04, a predetermined time TM1 for setting heater energization stop timing after the temporary shutdown is set. Specifically, the outside air temperature at the time of shutdown of the internal combustion engine 3 is read, and the table in FIG. 4 is referenced to set the predetermined time TM1 based on the outside air temperature. In step A04, temporary shutdown time of the internal combustion engine 3 is integrated, and cooling water temperature is taken in sequentially.

Then in step A05, it is determined whether temporary shutdown time of the internal combustion engine 3 is equal to or longer than the predetermined time TM1, or the cooling water temperature is equal to or lower than a predetermined temperature TW1, and if NO, control returns to step A03. The predetermined temperature TW1 is preset and stored.

When the determination in step A05 is YES, that is, when the temporary shutdown time is equal to or longer than the predetermined time TM1, or the cooling water temperature is equal to or lower than the predetermined temperature TW1, control proceeds to step A06. In step A06, a signal of the heater energization cancel flag (flag=1) is transmitted to the first control unit 11, and the program is terminated (step A07).

On the other hand, the first control unit 11 performs the heater energization control as shown in FIG. 5.

When the program of the heater energization control in FIG. 5 is started (step B01), at first in step B02, the first control unit 11 inputs various parameters such as a signal of the heater energization cancel flag. Then in step B03, it is determined whether heater energization conditions have been established.

When the determination in step B03 is YES, control proceeds to step B04. In step B04, it is determined if the heater energization cancel flag has not been established (flag=0).

When the determination in step B04 is YES, control proceeds to step B05. In step B05, heater energization is turned on to perform a duty control.

On the other hand, when the determination in step B03 is NO, or when the determination in step B04 is NO, control proceeds to step B06. In step B06, heater energization is turned off.

After the process in step B05, or after the process in step B06, the program is terminated (step B07).

As a result, in the present embodiment, the timing for stopping energization of the heaters 8A and 9A is set to a point in time when a predetermined time set based on the outside air temperature has elapsed, or a point in time when the cooling water temperature of the internal combustion engine 3 has dropped to a predetermined temperature.

Accordingly, cracking of the exhaust gas sensor 7 caused by water splashing at the time of restarting the internal combustion engine 3 from a long-time shutdown state can be avoided.

Moreover, the second control unit 12 sets the predetermined time based on the outside air temperature and measures elapsed time since shutdown of the internal combustion engine 3, and performs the first determination of whether the measured elapsed time has reached the set predetermined time. The second control unit 12 also performs the second determination of whether the cooling water temperature of the internal combustion engine 3 has reached a predetermined temperature for determination of a decrease in water temperature set beforehand. The second control unit 12 also transmits a signal for cancelling heater energization of the first control unit 11 based on these two determinations. Then the first control unit 11 stops energization of the heaters 8A and 9A upon reception of the signal for canceling the heater energization.

Accordingly, by performing the determination by the second control unit 12 that can determine the state of the vehicle 1, the control command function for controlling an output of the internal combustion engine 3, taking into consideration the SOC value or the like of the traction battery 5, can be used, thereby enabling comprehensive determination, and hence, useless control hunting hardly occurs. Moreover, the determination function of the first control unit 11 can be omitted, and the calculation load can be decreased.

The embodiment described above and shown in the drawings is an example only of the present invention, and needless to say, the present invention includes one directly indicated by the explained embodiment, as well as various improvements and modifications performed by a person skilled in the art within the scope of claims.

The apparatus for controlling an internal combustion engine according to an embodiment of the present invention can be favorably used for a vehicle such as a hybrid vehicle, in which changeover between an operating state and a shutdown state of the internal combustion engine is performed repeatedly during driving of the vehicle, and the shutdown state of the internal combustion engine continues for relatively long periods, and thus, industrial applicability is significant.

What is claimed is:

1. An apparatus for controlling an internal combustion engine, comprising:
    an exhaust gas sensor that detects a specific component in the exhaust gas of the internal combustion engine;
    a heater that is attached to the exhaust gas sensor and that can promptly activate the exhaust gas sensor and maintain the exhaust gas sensor in an activated state; and
    a control device that executes air-fuel ratio feedback control based on a detection result of the exhaust gas sensor in the activated state, and in a case in which the internal combustion engine is shut down, stops energization of the heater at a predetermined timing after shutdown of the internal combustion engine,
    wherein the control device sets the timing for stopping energization of the heater after shutdown of the internal combustion engine, to a point in time when a predetermined time set based on outside air temperature has elapsed or a point in time when cooling water temperature of the internal combustion engine has dropped to a predetermined temperature,
    wherein the control device includes a first control unit that controls the internal combustion engine, and a second control unit having a control command function for instructing the first control unit,
    wherein the second control unit sets the predetermined time based on the outside air temperature, and measures the elapsed time since shutdown of the internal combustion engine, and performs a first determination of whether the measured elapsed time has reached the set predetermined time, while the second control unit performs a second determination of whether the cooling water temperature of the internal combustion engine has reached the predetermined temperature for determination of a decrease in water temperature set beforehand, and also transmits a signal for cancelling heater energization, to the first control unit based on these two determinations, and
    wherein the first control unit stops energization of the heater upon reception of the signal for cancelling the heater energization.

2. An apparatus for controlling an internal combustion engine according to claim 1, wherein the internal combustion engine is mounted on a hybrid vehicle that is driven by a drive motor, and the internal combustion engine drives a generator capable of charging a battery that supplies power to the drive motor corresponding to a charge state of the battery.

* * * * *